United States Patent
Huang

(10) Patent No.: US 8,693,774 B2
(45) Date of Patent: Apr. 8, 2014

(54) IMAGE ACCESSING APPARATUS AND IMAGE DATA TRANSMISSION METHOD THEREOF

(75) Inventor: Yao-Hsien Huang, New Taipei (TW)

(73) Assignee: SONIX Technology Co., Ltd., Hsinchu (TW)

( * ) Notice: Subject to any disclaimer, the term of this patent is extended or adjusted under 35 U.S.C. 154(b) by 285 days.

(21) Appl. No.: 13/323,822

(22) Filed: Dec. 13, 2011

(65) Prior Publication Data

US 2012/0148154 A1    Jun. 14, 2012

(30) Foreign Application Priority Data

Dec. 13, 2010    (TW) .............................. 99143537 A

(51) Int. Cl.
*G06K 9/00*    (2006.01)
(52) U.S. Cl.
USPC ............................................... 382/167
(58) Field of Classification Search
USPC .......................... 382/167, 233, 276
See application file for complete search history.

(56) References Cited

U.S. PATENT DOCUMENTS 6,184,936 B1    2/2001    Hu

FOREIGN PATENT DOCUMENTS

| CN | 101303638 | 11/2008 |
| CN | 101710993 | 5/2010 |

OTHER PUBLICATIONS

Keith Jack, "Video Demystified A Handbook for the Digital Engineer," May 14, 2007, pp. 22-25.
USB-IF, "Universal Serial Bus 3.0 Specification, revision 1.0," Nov. 12, 2008.
ITU-R BT. 601-6, "Recommendation ITU-R BT.601-6," Feb. 23, 2007, pp. 1-13.
"Office Action of Taiwan Counterpart Application", issued on Jun. 17, 2013, p. 1-p. 23.

*Primary Examiner* — Duy M Dang
(74) *Attorney, Agent, or Firm* — Jianq Chyun IP Office

(57) ABSTRACT

A method for transferring image data by using an interface with at least two transfer pipes to transfer from an image accessing unit to a computer is disclosed. The method includes: obtaining image data in response to a control command from the computer; converting the image data to sampled structure data and transferring the sampled structure data to the computer through at least one of the data transfer pipes; and providing information to the computer to recover the received sampled structure data.

15 Claims, 4 Drawing Sheets

|   | Y11 | U12 | Y13 | V14 | | |
|---|---|---|---|---|---|---|
| ROW1 | ● | ● | ● | ● | ················ | ● |
|   | Y21 | U22 | Y23 | V24 | | |
| ROW2 | ● | ● | ● | ● | ················ | ● |
|   | Y31 | U32 | Y33 | V34 | | |
| ROW3 | ● | ● | ● | ● | ················ | ● |
|   | ⋮ | ⋮ | ⋮ | ⋮ | | |
| ROWN | ● | ● | ● | ● | ················ | ● |

FIG. 1 (RELATED ART)

|       | Y11 | U12→B | Y13 | V14 |       |   |
|-------|-----|-------|-----|-----|-------|---|
| ROW1  | ●   | ●     | ●   | ●   | ……………… | ● |
|       | Y21 | U22   | Y23 | V24→B |     |   |
| ROW2  | ●   | ●     | ●   | ●   | ……………… | ● |
|       | Y31 | U32→B | Y33 | V34 |       |   |
| ROW3  | ●   | ●     | ●   | ●   | ……………… | ● |
| ROWN  | ●   | ●     | ●   | ●   | ……………… | ● |

IMAGE ACCESSING APPARATUS AND IMAGE DATA TRANSMISSION METHOD THEREOF

CROSS-REFERENCE TO RELATED APPLICATION

This application claims the priority benefit of Taiwan application serial no. 099143537, filed on Dec. 13, 2010. The entirety of the above-mentioned patent application is hereby incorporated by reference herein and made a part of this specification.

BACKGROUND OF THE INVENTION

1. Technical Field

The invention relates generally to an image accessing unit and an image data transmission method thereof.

2. Description of Related Art

With the advancement of electronic technologies, personal computers (PCs) have become indispensable in our daily lives. As a result, PC users have become aware of peripheral products with functionalities that can be enhanced when used with a personal computer or which enhance the functionalities of the personal computer.

As an example, image accessing units (e.g., digital cameras and other digital imaging devices) are popular products that can be used with or integrated into a personal computer, notebook computer, tablet, mobile device, digital display frame, television with integrated processing, or other digital device. In conventional art, data from an image accessing unit is typically transferred to the personal computer through a universal serial bus (USB) or similar multi-pin interface. Please refer to the FIG. 1 which illustrates a schematic diagram of an image data accessed by a conventional image accessing unit. The conventional image accessing unit typically obtains a so-called YUV 4:2:2 image data through an image access operation. The image data is arranged in an array, and each of the rows ROW1-ROW3 includes the corresponding luma component Y and chroma components U and V of the sampled image. Taking the row ROW1 as an example, the row ROW1 includes the luma components Y11 and Y13 and the chroma components U12 and V14. ROW2 includes the luma components Y21 and Y23 and the chroma components U22 and V24, while row ROW3 includes the luma components Y31 and Y33 and the chroma components U32 and V34.

The conventional image accessing unit completely transfers the 4:2:2 image data depicted in FIG. 1 to the computer. When transporting large quantities of image data using currently available transmission speed with the currently available transmission bandwidth, transfer is slow and the image display performance of the computer is sluggish.

SUMMARY OF THE INVENTION

The invention provides a method for enhancing the transmission speed for transferring image data from an image accessing unit to a computer or other digital device. While reference is made herein to computers and other digital devices, it should be understood that any specific type of device is exemplary, and reference to a computer or other digital devices is intended to be a broad reference to any digital device that is the recipient of the transferred image date.

The invention further provides an image accessing apparatus capable of rapidly transferring the accessed image data to a computer.

The invention further provides a method for transferring image data adapted for a universal serial bus (USB) interface having at least two data transfer pipes to transfer data from an image accessing unit to a computer. The method for transferring the image data includes providing the image accessing unit access to an image for obtaining the image data according to a control command from the computer. After converting the image data to a sampled structure data by replacing certain data elements with blank entries, the sampled structure data is transferred to the computer through at least one of the data transfer pipes. The computer recovers the received sampled structure data to obtain recovered image data.

The invention also provides an image accessing apparatus, including a computer and an image accessing unit. The image accessing unit includes a USB transmission interface and a controller. The USB transmission interface has a first data transfer pipe for connecting to the computer and the image accessing unit to transmit an image data. The controller is coupled to the USB transmission interface, and the controller controls the image accessing unit to access an image for obtaining the image data according to a control command received from the computer, and after converting the image data as a sampled structure data, the sampled structure data is transferred to the computer through the first data transfer pipe. The computer recovers the received sampled structure data to obtain recovered image data.

In summary, exemplary embodiments of the invention convert the original image data into sampled structure data having a lower data amount, so as to reduce the total data amount of the image data. At the same time, by utilizing a dual transfer pipe function, the data amount and speed transmitted from the image accessing unit to the computer is increased. Accordingly, the image accessing unit can more rapidly transport the accessed and obtained image data to the computer, and thereby enhance the overall speed and efficiency.

In order to make the aforementioned and other features and advantages of the invention more clear, various exemplary embodiments are described in detail herein.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram of an image data accessed by a conventional image accessing unit.

FIG. 2B is a schematic diagram of a sampled structure data according to an embodiment of the invention.

DESCRIPTION OF EMBODIMENTS

Figure 2A:
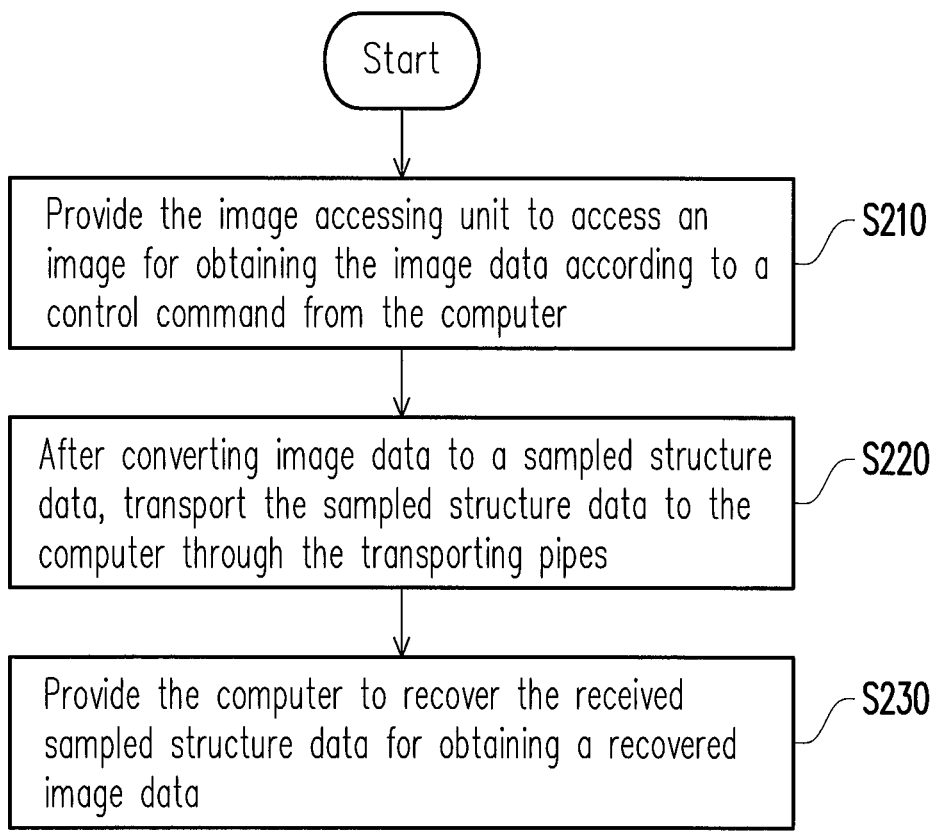
FIG. 2A is a flowchart of a method for transporting an image data according to an embodiment of the invention.

Please refer to FIG. 2A which is a flowchart illustrating a method for transferring image data according to an embodiment of the invention. An embodiment of the image data transmission method is adapted for transferring image data accessed by an image accessing unit (not shown) to a computer, in which a universal serial bus (USB) interface is used for the transfer. The image data transmission method according to the present embodiment includes the image accessing unit accessing the image data in response to a control command from the computer (Step S210). The accessed image data is then converted to sampled structure data. After the image data is converted to sampled structure data, the sampled structure data is transferred to the computer through at least one of the transfer pipes (Step S220). It should be noted that the image data generated by the image access operation performed by the image accessing unit may be the 4:2:2 image data described above in the Description of Related Art. The 4:2:2 image data may be converted to obtain sampled structure data having a smaller amount of data. Thus in Step S220, the original large amount of image data is converted into the sampled structure data having the smaller amount of data. Thereafter, using one or more transfer pipes provided by the USB interface, the sampled structure data is transferred to the computer.

When transmitting the sampled structure data using two or more transfer pipes, the sampled structure data may be divided into two sampled data sections. Moreover, the at least two sampled data sections may be transferred through different transfer pipes simultaneously. Accordingly, transmission efficiency can be increased dramatically.

It should be apparent that after the computer receives the sampled data sections, the complete sampled structure data can be obtained by combining all the sampled data sections. Such division and re-combination of the image data may be implemented by at least one of a built-in hardware circuitry, a software program, or a firmware program on the image accessing unit and the computer.

After the computer receives the sampled structure data transferred by the image accessing unit through the USB interface, a recover operation may be performed on the received sampled structure data for obtaining recovered image data (Step S230). In an exemplary embodiment, the image accessing unit provides the computer with information relating to recovery of the sampled structure data such as specification of a recovery protocol or reference to a standard protocol. The computer may use the recovered image data to display on a screen configured therewith, for example.

The data amount of the recovered image data obtained in the present embodiment is the same as a data amount of the original image data (e.g. the 4:2:2 image data). In other words, the steps described in the present embodiment do not reduce the data amount of the original image data recovered by the computer.

In an exemplary embodiment, the image accessing unit is a PC/notebook camera configured on the personal computer.

The details regarding the conversion method of the image data and the sampled structure data, as well as the recovery operation for recovering the sampled structure data as the recovered image data are described in reference to FIG. 2B, which illustrates a schematic diagram of sampled structure data 200 according to the present embodiment of the invention. In FIG. 2B, the conversion of the sampled structure data 200 is performed according to the 4:2:2 image data depicted in FIG. 1. The rows ROW1-3 in the sample structure data depicted in FIG. 2B respectively corresponds to the rows ROW1-3 depicted in FIG. 1. When converting the image data, the first chroma components U12 and U32 in the odd rows (e.g. the rows ROW1 and ROW3) of the sampled structure data 200 may be converted to a blank data B. Moreover, the second chroma component V24 in the even rows (e.g. the row ROW2) of the sampled structure data 200 is converted into the blank data B. The blank data B represents that no data exists in the corresponding field, and thus no storage space is needed.

Accordingly, each set of four luma and chroma components (two luma components and two chroma components) included in each row of the sampled structure data 200 may be converted into three components (two luma components and one chroma component). In other words, the data amount of the sampled structure data 200 is ¾ of the data amount of the image data before conversion.

The afore-described operation is merely an illustrative example of replacing the chroma components U12 and U32 on the rows ROW1 and ROW3 by the blank data B, and the invention is not limited thereto. In practice, the chroma components V14 and V34 in the odd rows ROW1 and ROW3 of the sampled structure data 200 may also be replaced by the blank data B (simultaneously replacing the chroma component U22 of the even row ROW2 by the blank data B) to generate the required sampled structure data 200. Moreover, the sampled structure data also can be constituted by replacing all the chroma components in the odd (or even) rows to blank data. The sampled structure data also can be constituted by replacing all the chroma components in the odd (or even) columns to blank data.

When the sampled structure data 200 is transferred to the computer, the computer performs the recovery operation according to the sampled structure data 200. In an exemplary embodiment, the chroma component of an adjacent row corresponding to the chroma component of each row replaced by the blank data B may be identified, and the chroma component of the adjacent row may be copied onto the blank data B. Taking the row ROW1 as an example, the original chroma component U12 of the row ROW1 was replaced by the blank data B, and the chroma component of the adjacent row ROW2 thereof is the chroma component U22. Therefore, by only copying the chroma component U22 onto the blank data B of the row ROW1, all of the luma and chroma components of the row ROW1 can be recovered. Based on the foregoing description, the original chroma component V24 on the row ROW2 may be obtained by copying the chroma components V14 or V34 on the rows ROW1 or ROW3, and the original chroma component U32 on the row ROW3 may be obtained by copying the chroma component U22 on the row ROW2.

In another embodiment, an average value of the chroma data of the two adjacent rows corresponding to the row replaced by the blank data B may be found, and the average value is copied onto the blank data B to complete the recovery operation. For example, when performing the recovery operation on the original chroma component V24 of the row ROW2, the average value of the chroma components V14 and V34 on the rows ROW1 and ROW3 is first calculated, and then the average value is copied onto the blank data B of the row ROW2, so as to obtain the complete luma and chroma components of the row ROW2.

In the description of the embodiments above, the 4:2:2 image data used for conversion is merely used as an illustrative example, and embodiments of the invention should not be construed as limited to only obtaining the sampled structure data through performing conversion according to the 4:2:2 image data. It should be apparent to one skilled in the art that, by applying the spirit proposed by embodiments of the invention, the conversion operation of the image data according to embodiments of the invention may be applied to various types of image data having both luma and chroma components (Y, U and V), such as 4:1:1 and 4:4:4 image data.

Figure 3:
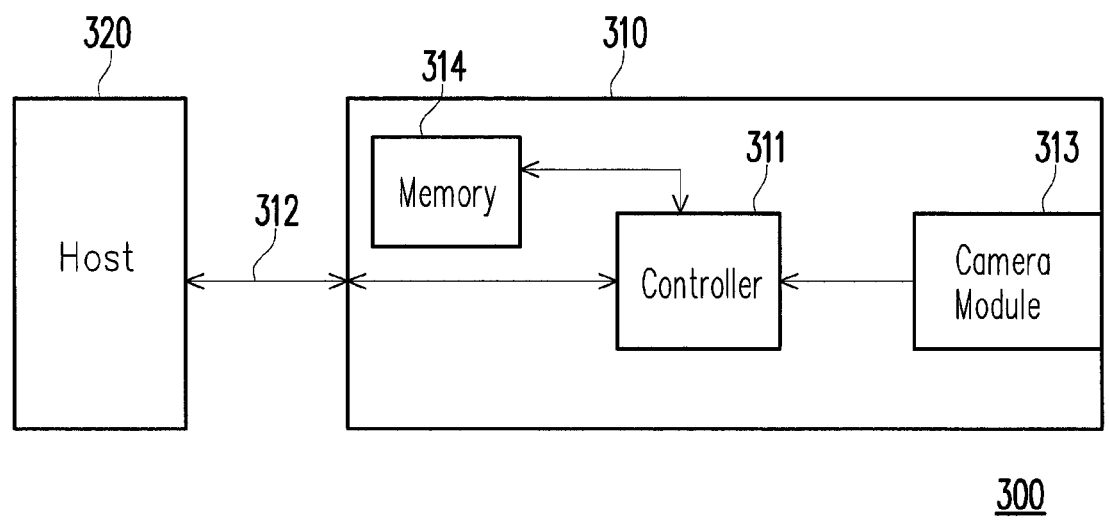
FIG. 3 is a schematic diagram of an image accessing apparatus according to another embodiment of the invention.

FIG. 3 is a schematic diagram of an image accessing apparatus 300 according to another exemplary embodiment of the invention. The image accessing apparatus 300 includes an image accessing unit 310 and a computer 320. The image accessing unit 310 includes a transmission interface 312, a controller 311, a camera module 313 for accessing image data of an original image, and a memory 314 for storing the image data. The image accessing unit 310 connects to the computer 320 through the transmission interface 312 and thereby transports the image data. The controller 311 is coupled to the camera module 313, the memory 314, and the transmission interface 312. The controller 311 controls the image accessing unit 310 to access an image to obtain the image data according to a control command received from the computer 320. After converting the image data as a sampled structure data, the sampled structure data is transferred to the computer 320 through at least one of the data transfer pipes. Moreover, the computer 320 recovers the received sampled structure data to obtain recovered image data.

In the present embodiment, the computer 320 may be a personal computer or a notebook computer, tablet, or any other type of digital device that displays images.

Since the embodiments described earlier have set forth the operation details of the controller 311 performing the conversion operation on the image data and the sampled structure data, using the dual data transfer pipes to transport the image data, and combining different sections of the image data to obtain the complete image data, further elaboration thereof is omitted hereafter.

While reference is made herein to particular interfaces such as the USB transmission interface, it will be understood that the disclosed invention is not limited to any particular type of interface. In addition, while reference is made to transfer pipes for use in transferring the data such as the data wires in a USB interface, it will be understood that the disclosed invention is not limited to transfer interfaces using physical wires or other hard pipes, but applies equally to any interface that uses a plurality of data transfer pipes, lines, channels, or pipes of any nature.

In view of the foregoing, embodiments of the invention convert the image data into sampled structure data having a lower data amount and transfer the sampled structure data to the computer. The computer then recovers the sampled structure data to obtain the recovered image data. Accordingly, the transmission time of the image data can be effectively reduced, thereby enhancing the system efficiency.

Software in accordance with the present disclosure, such as program code and/or data, may be stored on one or more machine readable mediums. It is also contemplated that software identified herein may be implemented using one or more general purpose or specific purpose computers, computer systems, processors, and/or other appropriate hardware, networked and/or otherwise.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for transferring image data via a universal serial bus (USB) interface having at least two data transfer pipes from an image accessing unit to a computer, the method comprising:
   obtaining the image data in response to a control command from the computer;
   converting the image data to sampled structure data, and transferring the sampled structure data to the computer through at least one of the data transfer pipes; and
   providing the computer with information relating to recovery of the sampled structure data.

2. The method for transferring image data as claimed in claim 1, wherein the step of transferring the sampled structure data to the computer comprises:
   dividing the sampled structure data into a first sampled data section and a second sampled data section; and
   transferring the first sampled data section and the second sampled data section to the computer through different data transfer pipes.

3. The method for transferring image data as claimed in claim 2, wherein the step of providing the computer with the information relating to recovery of the sampled structure data comprises:
   providing the computer with information necessary to combine a first sampled data section and a second sampled data section to form the sampled structure data for obtaining the recovered image data.

4. The method for transferring image data as claimed in claim 1, wherein the step of converting the image data to the sampled structure data comprises:
   altering a plurality of first chroma components in a plurality of odd rows of the image data into a plurality of blank data; and
   altering a plurality of second chroma components in a plurality of even rows of the image data into a plurality of blank data.

5. The method for transferring image data as claimed in claim 4, wherein the information relating to recovery of the sampled structure data comprises:
   copying a plurality of second chroma components in each of the odd rows for altering the blank data corresponding to each of the even rows adjacent to each of the odd rows; and
   copying a plurality of first chroma components in each of the even rows for altering the blank data corresponding to each of the odd rows adjacent to each of the even rows.

6. The method for transporting image data as claimed in claim 4, wherein the information relating to recovery of the sampled structure data comprises:
   calculating a first chroma component average value of the first chroma components on the two odd rows adjacent to each of the blank data in each of the even rows, and copying the first chroma average value for altering each of the blank data in each of the even rows; and
   calculating a second chroma component average value of the second chroma components on the two even rows adjacent to each of the blank data in each of the odd rows, and copying the second chroma average value for altering each of the blank data in each of the odd rows.

7. The method for transferring image data as claimed in claim 4, wherein the step of transferring the sampled structure data to the computer comprises:
   dividing the sampled structure data into a first sampled data section and a second sampled data section; and
   transferring the first sampled data section and the second sampled data section to the computer through different data transfer pipes.

8. The method for transferring image data as claimed in claim 7, wherein the information relating to recovery of the sampled structure data comprises:
   combining the first sampled data section and the second sampled data section to form the sampled structure data for obtaining the recovered image data.

9. An image accessing unit, comprising:
   a USB transmission interface having a first data transfer pipe for connecting the image accessing unit to a computer to transmit image data; and a controller coupled to the USB transmission interface configured for controlling the image accessing unit to obtain image data in response to a control command received from the computer, and after converting the image data to sampled structure data, transferring the sampled structure data to the computer via the first data transfer pipe, wherein, the image data can be substantially recovered from the sampled structure data.

10. The image accessing unit of claim 9, wherein the USB transmission interface has a second data transfer pipe, and wherein the controller divides the sampled structure data into a first sampled data section and a second sampled data section, and the first sampled data section and the second sampled data section are transferred to the computer through the first data transfer pipe and the second data transfer pipe respectively.

11. The image accessing unit of claim 9, wherein the controller alters a plurality of first chroma components in a plurality of odd rows of the image data into a plurality of blank data, and alters a plurality of second chroma components in a plurality of even rows of the image data into a plurality of blank data, so as to obtain the sampled structure data.

12. The image accessing unit of claim 11, wherein the image data can be substantially recovered from the sampled structure data by copying a plurality of second chroma components in each of the odd rows for altering the blank data corresponding to each of the even rows adjacent to each of the odd rows, and copying a plurality of first chroma components in each of the even rows for altering the blank data corresponding to each of the odd rows adjacent to each of the even rows.

13. The image accessing apparatus as claimed in claim 11, wherein the image data can be substantially recovered from the sampled structure data by calculating a first chroma component average value of the first chroma components on the two odd rows adjacent to each of the blank data in each of the even rows, copying the first chroma average value to replace each of the blank data in each of the even rows, calculating a second chroma component average value of the second chroma components on the two even rows adjacent to each of the blank data in each of the odd rows, and copying the second chroma average value to replace each of the blank data in each of the odd rows.

14. The image accessing unit of claim 9, wherein the image data can be substantially recovered from the divided sampled structure data by combining a section of the image data and another section of the image data.

15. The image accessing unit of claim 9, further comprising:

a camera module coupled to the controller, configured for accessing the image for obtaining the image data; and a memory coupled to the controller, configured for storing the image data.

* * * * *